(12) United States Patent
Kim et al.

(10) Patent No.: US 9,293,782 B2
(45) Date of Patent: Mar. 22, 2016

(54) WINDER FOR ELECTRODE ASSEMBLY OF RECHARGEABLE BATTERY AND ELECTRODE ASSEMBLY MANUFACTURING METHOD USING THE SAME

(75) Inventors: Un-Seop Kim, Yongin-si (KR); Eun-Soo Sin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 174 days.

(21) Appl. No.: 13/008,245

(22) Filed: Jan. 18, 2011

(65) Prior Publication Data

US 2011/0289766 A1    Dec. 1, 2011

(30) Foreign Application Priority Data

Jun. 1, 2010    (KR) .................. 10-2010-0052013

(51) Int. Cl.
*H01M 10/14* (2006.01)
*H01M 10/04* (2006.01)

(52) U.S. Cl.
CPC ...... *H01M 10/0404* (2013.01); *H01M 10/0431* (2013.01); *Y10T 29/49108* (2015.01)

(58) Field of Classification Search
USPC ............................................. 29/730; 429/94
See application file for complete search history.

(56) References Cited

U.S. PATENT DOCUMENTS

| 6,692,542 B1 | 2/2004 | Kashiyama et al. |
| 2004/0107564 A1 | 6/2004 | Kurimoto et al. |

FOREIGN PATENT DOCUMENTS

| CN | 1633728 A | 6/2005 |
| JP | 09-194091 | 7/1997 |
| JP | 09-274930 | 10/1997 |
| JP | 10-231055 | 9/1998 |
| JP | 11-219718 | 8/1999 |
| JP | 11-265726 | 9/1999 |
| JP | 2001-216998 | 8/2001 |
| JP | 2001-338693 A | 12/2001 |
| JP | 2003-045473 | 2/2003 |
| JP | 2003-45473 A | 2/2003 |
| JP | 2003-297412 A | 10/2003 |
| JP | 2007-329059 A | 12/2007 |
| KR | 1983-0000508 | 4/1983 |

(Continued)

OTHER PUBLICATIONS

Office Action dated Feb. 3, 2012 for corresponding KR Application No. 10-2010-0052013.

(Continued)

*Primary Examiner* — Tracy Dove
(74) *Attorney, Agent, or Firm* — Knobbe Martens Olson & Bear LLP

(57) ABSTRACT

An exemplary embodiment provides a winder for an electrode assembly of a rechargeable battery capable of improving productivity by shortening a winding cycle. A winder for an electrode assembly of a rechargeable battery according to an exemplary embodiment includes: a nip roll catching and feeding a positive plate and a negative plate, and a separator; a rotor disposed below the nip roll to rotate; and a plurality of winding cores arranged in the rotor at a regular interval in a rotation direction of the rotor to rotate and move forward or backward from the rotor, wherein the center of the nip roll, the center of any one winding core among the plurality of winding cores, and one surface of an electrode assembly of another winding core which is winding-completed form a straight line.

11 Claims, 12 Drawing Sheets

(56) References Cited

FOREIGN PATENT DOCUMENTS

| KR | 10-2004-0005898 | 1/2004 |
| KR | 10-2008-0042967 | 5/2008 |
| KR | 10 2009 0037506 | 4/2009 |

OTHER PUBLICATIONS

Office Action dated Nov. 6, 2012 for corresponding JP Application No. 2010-201769.

Office Action dated Jun. 21, 2013 for corresponding CN Application No. 201110069258.3.

Office Action dated Dec. 10, 2013 for corresponding CN Application No. 201110069258.3.

Third Chinese Office Action dated May 20, 2014 for Chinese Patent Application No. CN 201110069258.3 which shares priority of Korean Patent Application No. KR 10-2010-0052013 with captioned U.S. Appl. No. 13/008,245.

JPO Public Notice of granting a patent dated Jan. 7, 2015 in JP Patent No. 5648996 B2.

WINDER FOR ELECTRODE ASSEMBLY OF RECHARGEABLE BATTERY AND ELECTRODE ASSEMBLY MANUFACTURING METHOD USING THE SAME

RELATED APPLICATIONS

This application claims priority to and the benefit of Korean Patent Application No. 10-2010-0052013 filed in the Korean Intellectual Property Office on Jun. 1, 2010, the entire contents of which are incorporated herein by reference.

BACKGROUND

1. Field

The described technology relates generally to a winder for an electrode assembly of a rechargeable battery winding a positive plate and a negative plate, and a separator of the rechargeable battery and an electrode assembly manufacturing method using the same.

2. Description of the Related Art

A rechargeable battery includes a positive plate and a negative plate, both formed by applying an active material onto a current collector, and a separator interposed therebetween. The electrode assembly of the rechargeable battery is formed by stacking the positive plate, the separator, and the negative plate and then winding the assembly into a jelly roll. A winder is used to manufacture the electrode assembly in the jelly roll form. The winder includes a pair of nip rolls, a rotor that rotates below the nip roll, and three winding cores that rotate while being disposed at first, second, and third positions of an equilateral triangle, respectively and move backward or forward from the rotor. The first position is vertically below the nip roll and the second and third positions form a symmetric structure at both right and left sides of an extension line linking the nip roll and the first position with each other while maintaining an interval of 120° in a rotation direction of the rotor.

While manufacturing the electrode assembly of the rechargeable battery using the winder, the rotor moves three winding cores to the first, second, and third positions in sequence. In this case, a first winding core winds the positive plate and the negative plate and the separator at the first position and then moves from the first position to the second position to complete a finishing process of the wound electrode assembly. While in the second position, a cutting process of the separator is performed and the electrode assembly is then removed by moving backward from the second position to the third position. The first winding core prepares for a new winding by moving forward from the third position to the first position.

After winding, the winding core at the first position moves to the second position and another winding core at the third position moves backward to the first position. Therefore, the separator connecting the nip roll and the winding core at the second position deviates from the winding core at the first position by maintaining an inclined state in a vertical direction. Accordingly, a control roll is provided at the side between the first and second positions to push the separator connecting the nip roll and the winding core at the second position towards each other so as to adjust the separator to be vertical between the nip roll and the winding core of the first position. While the separator is in the vertical state, the winding core at the first position moves forward from the rotor to start new winding by using the separator, and the positive plate and the negative plate.

In the winder for the electrode assembly of the rechargeable battery, after winding is completed at the first position of the rotor, in order to start new winding, the separator should be adjusted to be in the vertical state by using the control roll, This results in the structure of the winder being complicated and the time when an empty winding core is moving is lengthened. Therefore, a winding cycle is lengthened which results in decreased productivity.

The above information disclosed in this Background section is only for enhancement of understanding of the background of the described technology and therefore it may contain information that does not form the prior art that is already known to a person of ordinary skill in the art.

SUMMARY

The described technology has been made in an effort to provide a winder for an electrode assembly of a rechargeable battery which improves productivity by shortening a winding cycle.

Further, the described technology has been made in effort to provide a winder for an electrode assembly of a rechargeable battery which shortens a waiting time of an empty winding core by the time of starting a new winding after the previous winding is completed.

Further, the described technology has been made in an effort to provide an electrode assembly manufacturing method using a winder for an electrode assembly of a rechargeable battery.

An exemplary embodiment provides a winder for an electrode assembly of a rechargeable battery that includes: a nip roll catching and feeding a positive plate and a negative plate, and a separator; a rotor disposed below the nip roll to rotate; and a plurality of winding cores arranged in the rotor at a regular interval in a rotation direction of the rotor to rotate and move forward or backward from the rotor, wherein the center of the nip roll, the center of any one winding core among the plurality of winding cores, and one surface of an electrode assembly of another winding core which is winding-completed form a substantially straight line.

The center of the nip roll, the center of any one winding core among the plurality of winding cores, and one surface of an electrode assembly of another winding core which is winding-completed may form a substantially vertical line.

A link line linking the center, of the nip roll, the center of the one winding core, and one surface of the electrode assembly of another winding core may be spaced from the rotation center of the rotor by a predetermined distance.

The winding core may include a first winding core, a second winding core, and a third winding core that are arranged at a regular interval in the rotation direction of the rotor, and the first winding core, the second winding core, and the third winding core may be sequentially positioned at a first position vertically below the nip roll, and a second position and a third position that are arranged at a regular interval in the rotation direction of the rotor at the first position.

The center of the nip roll, the center of any one winding core positioned at the first position among the first winding core, the second winding core, and the third winding core, and one surface of an electrode assembly of a winding core positioned at the second position may form the vertical line.

Another exemplary embodiment provides a method for manufacturing an electrode assembly of a rechargeable battery that includes: a first step of mounting a positive plate and a negative plate, and a separator fed from a nip roll on a winding core at a first position below the nip roll among three winding cores arranged at a regular interval in a rotation direction of a rotor; a second step of winding in the winding core at the first position; a third step of moving the winding-completed winding core from the first position to a second position; a fourth step of finishing and cutting an electrode assembly of the moved winding core at the second position; a fifth step of moving the winding core loading the finished/cut electrode assembly from the second position to a third position; a sixth step of removing an electrode assembly of the moved winding core at the third position from the winding core; and a seventh step of moving the winding core removed with the electrode assembly to the first position, wherein at the first step, the center of the nip roll, the center of the winding core at the first position, and one surface of an electrode assembly wound at the second position are arranged in a substantially straight line.

At the first step, the center of the nip roll, the center of the winding core at the first position, and one surface of an electrode assembly wound at the second position may be arranged in a substantially vertical line.

According to the exemplary embodiments, since the center of a nip roll, the center of a first winding core (first position), and one surface of an electrode assembly mounted on a winding core (second position) that is winding-completed and moved are formed in a straight line, it is possible to directly mount a positive plate, a negative plate, and a separator by moving forward one winding core (first position) supplied with being empty. That is, it is possible to shorten a waiting time of the empty winding core by the time of starting new winding after winding is completed. Accordingly, it is possible to shorten a winding cycle and improve productivity in manufacturing the electrode assembly.

DETAILED DESCRIPTION

Figure 1:
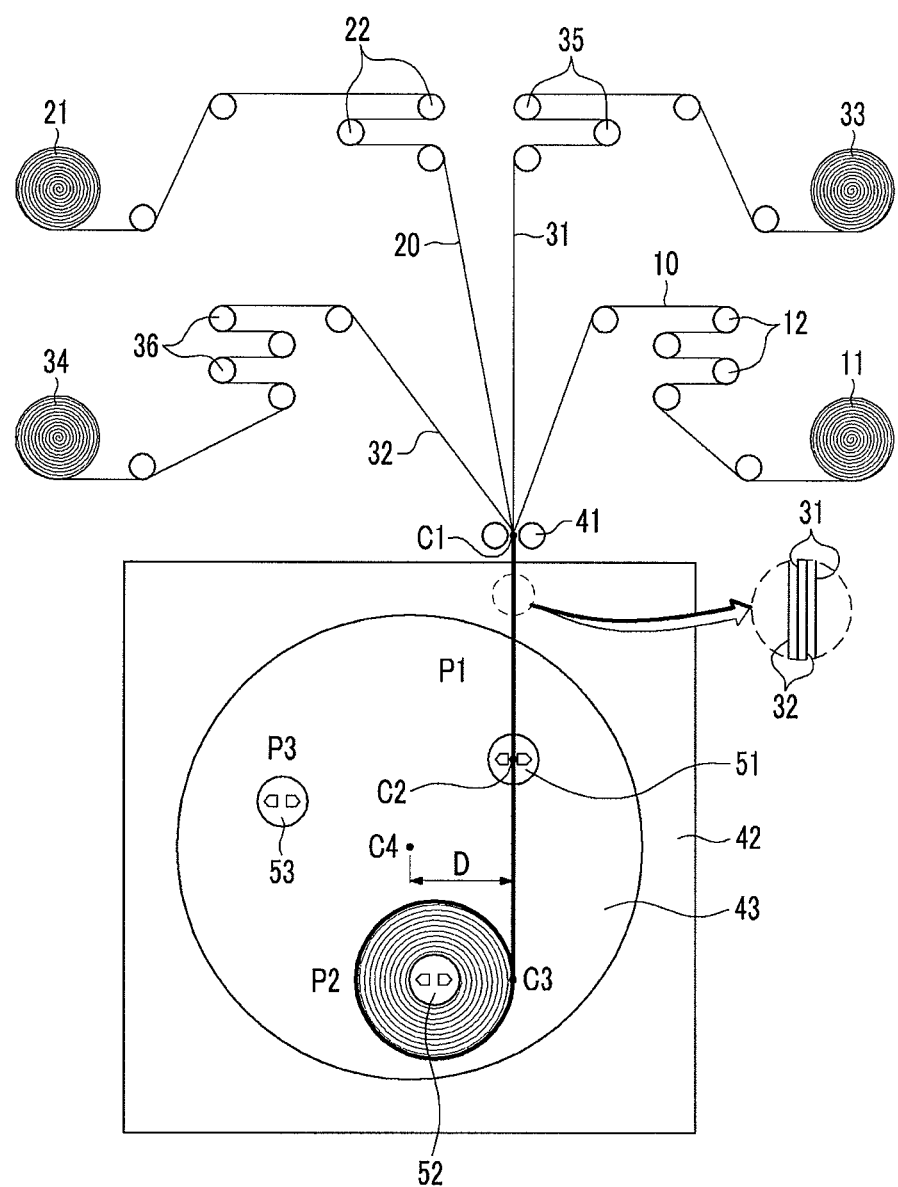
FIG. 1 is a schematic diagram of a winder for an electrode assembly of a rechargeable battery according to an exemplary embodiment.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. The drawings and description are to be regarded as illustrative in nature and not restrictive. Like reference numerals designate like elements throughout the specification.

FIG. 1 is a schematic diagram of a winder for an electrode assembly of a rechargeable battery according to an exemplary embodiment. Referring to FIG. 1, the winder according to the exemplary embodiment includes a positive plate feeding roll 11 and a first travel roll 12, a negative plate feeding roll 21 and a second travel roll 22, first and second separator feeding rolls 33 and 34 and third and fourth travel rolls 35 and 36, one pair of nip rolls 41, and a rotor 43 feeding and travelling a positive plate 10 and a negative plate 20 and first and second separators 31 and 32 in a strip shape, respectively. The positive plate 10 and the negative plate 20 and the first and second separators 31 and 32 are fed to the rotor 43 via the nip roll 41 while being wound and caught on the first, second, third, and fourth travel rolls 12, 22, 35, and 36, respectively.

The nip roll 41 catches the positive plate 10 and the negative plate 20 and the first and second separators 31 and 32 fed through the first, second third, and fourth rolls 12, 22, 35, and 36 that are stacked and feeds them to the rotor 43. For example, the nip roll 41 may be formed by a rotating driving roll and a support roll supporting the driving roll and rotating by the driving roll. The rotor 43 is rotatably mounted on a bracket 42 provided below the nip roll 41 and is mounted with a plurality of winding cores that independently rotates while being disposed in a equilateral triangle at one side and move backward or forward from the rotor 43. For example, the rotor 43 is mounted with three winding cores, i.e., first, second, and third winding cores 51, 52, and 53.

Each of the first, second, and third winding cores 51, 52, and 53 is disposed at any one of first, second, and third positions P1, P2, and P3 in the rotor 43. Even though the positions of the first, second, and third winding cores 51, 52, and 53 are changed by rotating the rotor 43, the first, second, and third positions P1, P2, and P3 maintain the same state as shown in FIG. 1. That is, the first, second, and third positions P1, P2, and P3 form the equilateral triangular structure at one side of the rotor 43 and maintains a set position with respect to a center C1 of the nip roll 41. For example, the first position P1 is vertically below the nip roll 41 and the second and third positions P2 and P3 is set while maintaining an interval of 120° in a rotation direction of the rotor 43 at the first position P1.

For convenience, when described in more detail with reference to the state of FIG. 1, the center C1 of the nip roll 41, the center C2 of the first winding core 51 positioned at the first position P1, and one surface C3 of an electrode assembly EA of the second winding core 52 that is positioned at the second position P2 and winding-completed form a substantially straight line. Since the first position P1 is positioned vertically below the center C1 of the nip roll 41, the center C1 of the nip roll 41, the center C2 of the first winding core 51, and one surface C3 of the electrode assembly EA of the second winding core 52 forms the substantially straight line. Further, a line linking the center C1 of the nip roll 41, the center C2 of the first winding core 51, and one surface C3 of the electrode assembly EA of the winding-completed second winding core 52 is spaced from a rotation center C4 of the rotor 43 by a set distance D. Before cutting the first and second separators 31 and 32 and by moving to the second position P2 after winding-completed at the first position P1, the line linking the centers C1 and C2 and one surface C3 coincides with the first and second separators 31 and 32 that reaches one surface C3 of the electrode assembly EA of the second winding core 52.

Figure 2:
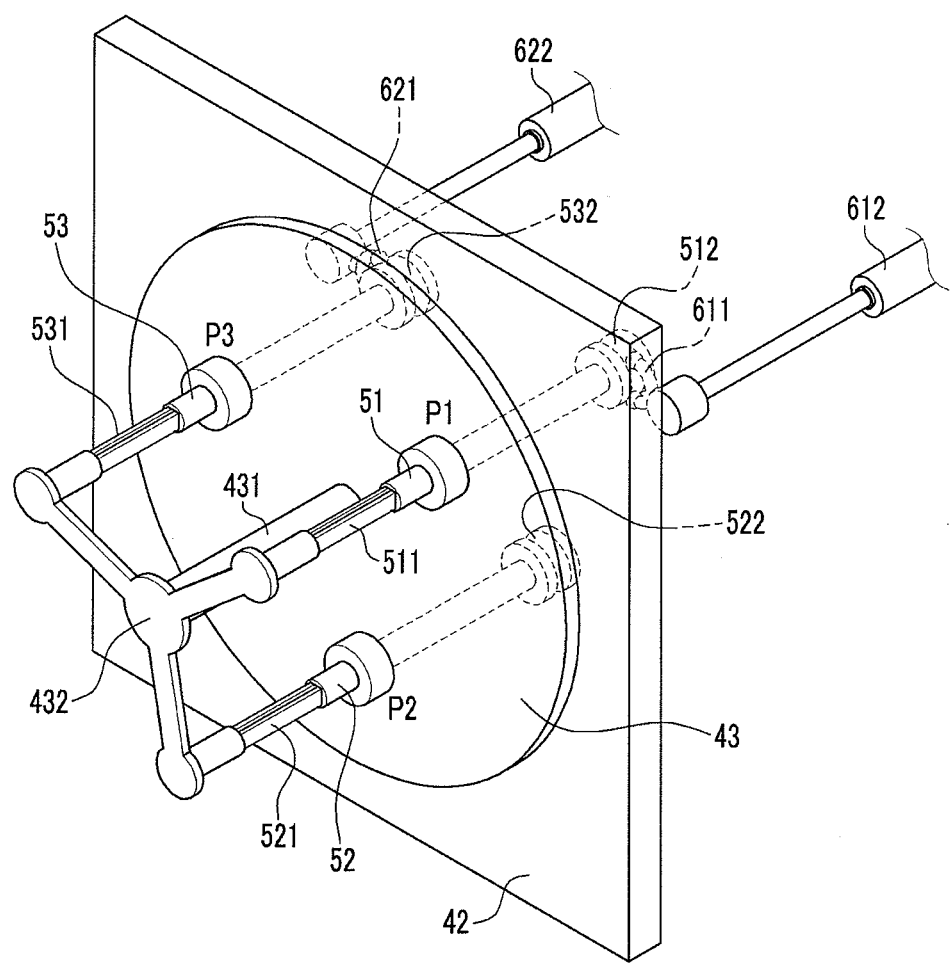
FIG. 2 is a perspective view of first, second, and third winding cores and a rotor in a winder of FIG. 1.

FIG. 2 is a perspective view of first, second, and third winding cores and a rotor in a winder of FIG. 1. Referring to FIG. 2, the first, second, and third winding cores 51, 52, and 53 has clamps 511, 521, and 531 opened to be mounted with the positive plate 10 and the negative plate 20 and the first and second separators 31 and 32 for winding, respectively. The rotor 43 further includes an arm member 431 formed at the center in parallel with the first, second, and third winding cores 51, 52, and 53 and a support member 432 at the provide at the end of the arm member 431 and supporting each of clamps 511, 521, and 531 of the first, second, and third winding cores 51, 52, and 53. Accordingly, the arm member 431 and the support member 432 can prevent the first, second, and third winding cores 51, 52, and 53 winding the electrode assembly from being dropped while being separated from the rotor 43.

Further, the winder according to the exemplary embodiment further includes first and second yokes 611 and 621 that selects any one of the first, second, and third winding cores 51, 52, and 53. The yokes 611 and 612 select by rotating the rotor 43 and selecting a winding core so as to move the selected winding core backwards toward the rear of the rotor 43 or move the selected winding core forward toward the front of the rotor 43. First and second cylinders 612 and 622 connected with the first and second yokes 611 and 621, respectively achieve these movements. Therefore, the first, second, and third winding cores 51, 52, and 53 are provided with grooves 512, 522, and 532 that selectively couple with the first and second yokes 611 and 621 in the rear of the rotor 43, respectively.

Referring to FIG. 2, by rotating the rotor 43, the first, second, and third winding cores 51, 52, and 53 may be respectively positioned at the first, second, and third positions P1, P2, and P3. In this case, the groove 532 of the third winding core 53 is positioned at the third position P3 and is coupled to the second yoke 621 to move backward or forward the third winding core 53 by a second cylinder 622. Further, the groove 512 of the first winding core 51 is positioned at the first position P1 and is coupled to the first yoke 611 to move forward or backward the first winding core 51 by a first cylinder 612.

At the third position P3, the second cylinder 622 moves forward while being separated from the second yoke 621 and moves backward while the second yoke 621 is coupled to the groove 532 of the third winding core 53 which moves forward, such that the completed electrode assembly may be removed from the third winding core 53. At the first position, the first cylinder 612 moves backward while being separated from the first yoke 611 and moves forward while the first yoke 611 is coupled to the groove 512 of the first winding core 51 which moves backward, such that the positive plate 10 and the negative plate 20, and the first and second separators 31 and 32 may be mounted on the first winding core 51.

In the exemplary embodiment, the known technology may be applied to a configuration of rotating the rotor 43 of the winder, rotating each of the first, second, and third winding cores 51, 52, and 53, and opening and closing the clamps 511, 521, and 531. Therefore, a detailed description thereof will be omitted.

Figure 3:
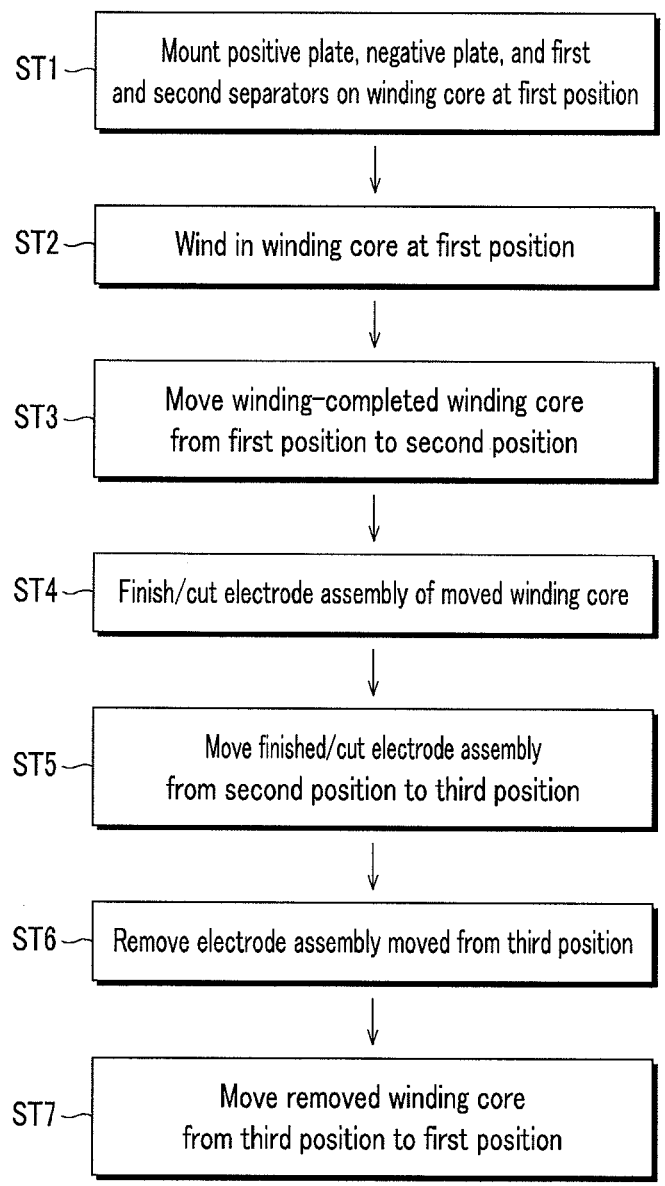
FIG. 3 is a flowchart of a method of manufacturing an electrode assembly of a rechargeable battery according to an exemplary embodiment.

FIG. 3 is a flowchart of a method of manufacturing an electrode assembly of a rechargeable battery according to an exemplary embodiment. Referring to FIG. 3, the manufacturing method according to the exemplary embodiment can manufacture a positive plate 10 and a negative plate 20, and first and second separators 31 and 32 as the electrode assembly EA of the rechargeable battery while passing through steps shown in FIGS. 3 and 4 to 12 by using a winder disclosed in FIGS. 1 and 2. The manufacturing method of FIG. 3 includes a first step ST1 to a seventh step ST7 as shown in FIGS. 4 to 12 and the steps are performed in the same manner for first, second, and third winding cores 51, 52, and 53. Meanwhile, in FIGS. 4 to 12, a dot mark (•) marked with a dot at the centers of first, second, and third winding cores 51, 52, and 53 represents a move-forward state of the winding core and an x mark (⊗) marked with x at the centers represents a move-backward state of the winding core.

In the manufacturing method of the exemplary embodiment, at the first step ST1, the positive plate 10 and the negative plate 20, and the first and second separators 31 and 32 fed from a nip roll 41 are mounted on a winding core at a first position P1. In this case, the winder arranges the center C1 of the nip roll 41, the center C2 of the winding core at the first position P1, and one surface C3 of an electrode assembly EA wound at a second position P2 in a straight line and facilitates the mounting of the positive plate 10 and the negative plate 20, and the first and second separators 31 and 32 on the winding core at the first position P1. At the step ST2, the plate 10 and the negative plate 20, and the first and second separators 31 and 32 are wound on the winding core at the first position P1. At the third step ST3, the winding-completed winding core moves from the first position P1 to the second position P2. At the fourth step ST4, an electrode assembly EA of the moved winding core at the second position P2 is finished and cut. At the fifth step ST5, the winding core loading the finished/cut electrode assembly EA moves from the second position P2 to a third position P3. At the sixth step ST6, an electrode assembly EA comprising the moved winding core at the third position P3 is removed from the winding core. At the sixth ST6, the winding core removed with the electrode assembly EA moves to the first position P1 and prepares a new winding cycle. Hereinafter, the steps will be described in more detail with reference to FIGS. 4 to 12.

Figure 4:
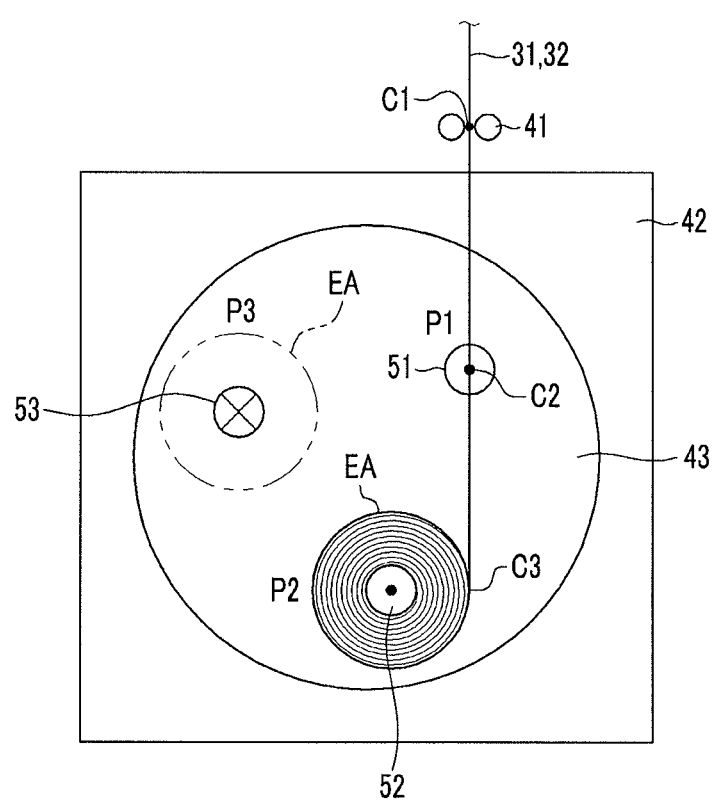
FIG. 4 is a state diagram of mounting in a first winding core, finishing/cutting in a second winding core, and removal in a third winding core.

FIG. 4 is a state diagram of mounting in a first winding core, finishing/cutting in a second winding core, and removal in a third winding core. Hereinafter, the first winding core 51 will be described with reference to FIGS. 3 and 4. At the first step ST1, the positive plate 10 and the negative plate 20, and the first and second separators 31 and 32 fed from the nip roll 41 are mounted on the first winding core 51 by moving forward the winding core (for convenience, referred to as "first winding core 51") at the first position P1 below the nip roll 41. In this case, by rotating a rotor 43 (for convenience, "clockwise direction" will be described as an example), the center C1 of the nip roll 41, the center C2 of the winding core 51 at the first position P1, and one surface C3 of the electrode assembly EA wound at a second position P2 are arranged in a substantially straight line, in more detail, a substantially vertical line. That is, since the first and second separators 31 and 32 are connected to the second winding core 52 through the nip roll 41, the first and second separators 31 and 32 are positioned at the center C2 of the first winding core 51. Therefore, the first winding core 51 moves forward from a previous position to be easily mounted with the positive plate 10 and the negative plate 20, and the first and second separators 31 and 32 through a clamp 511. After winding is completed, in order to start new winding at the first position P1, when the positive plate 10 and the negative plate 20, and the first and second separators 31 and 32 are mounted, the empty winding core 51 is retained in the backwards position until the winding core is in the first position. As a result, the winding cycle is shortened and in addition, the productivity of manufacturing the electrode assembly EA is improved. In this case, the previously wound electrode assembly EA is taped and finished in the second winding core 52 at the second position P2, the first and second separators 31 and 32 are cut, and the previously wound electrode assembly EA is removed from the third winding core 53 by moving backward the third winding core 53 at the third position P3.

Figure 5:
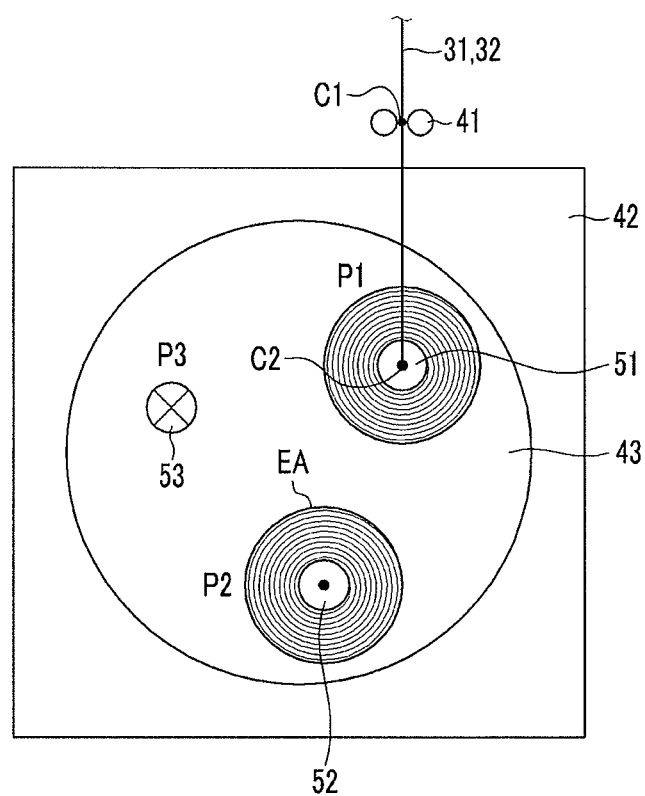
FIG. 5 is a winding operation state diagram of a first winding core following FIG. 4.

FIG. 5 is a winding operation state diagram of a first winding core following FIG. 4. Referring to FIGS. 3 and 5, the first winding core 51 will be described below. At the second step ST2, by the rotation of the first winding core 51 at the first position P1, the positive plate 10 and the negative plate 20, and the first and second separators 31 and 32 mounted on the first winding core 51 are wound. In this case, the second winding core 52 at the second position P2 maintains the loading of the finished and cut electrode assembly EA and the third winding core 53 at the third position P3 maintains the backward position of the corresponding electrode assembly EA.

Figure 6:
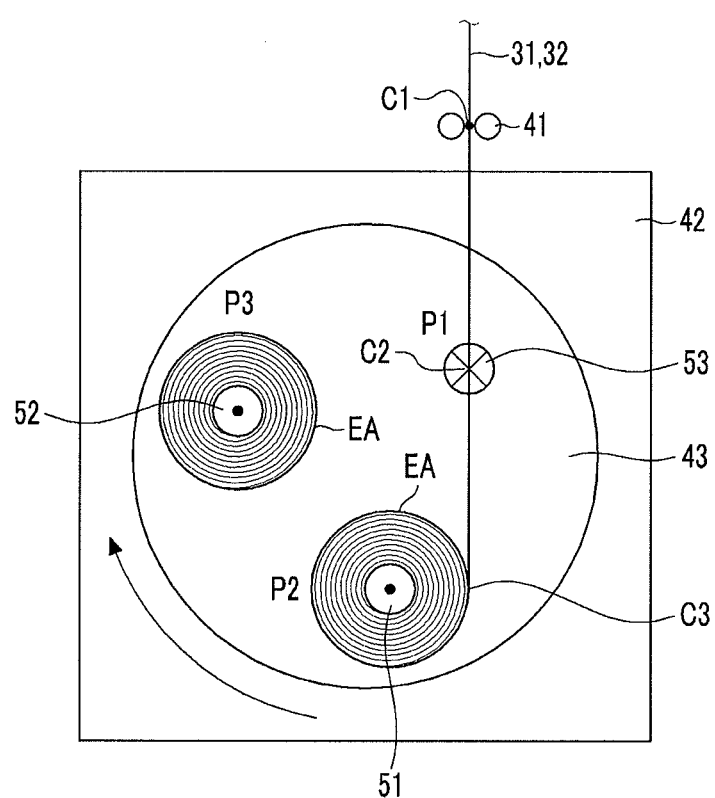
FIG. 6 is a rotating operation state diagram of a rotor after the winding-completion of a first winding core following FIG. 5.

FIG. 6 is a rotating operation state diagram of a rotor after the winding-completion of a first winding core following FIG. 5. Referring to FIGS. 3 and 6, the first winding core 51 will be described below. At the third step ST3, the first winding core 51 loading the electrode assembly EA, which has its winding completed by the rotation of the rotor 43, moves from the first position P1 to the second position P2. Further, the center C1 of the nip roll 41, the center C2 of the third winding core 53 at the first position P1, and one surface C3 of the electrode assembly EA wound at the second position P2 are arranged in the straight line, in more detail, the vertical line. That is, since the first and second separators 31 and 32 are connected to the first winding core 51 through the nip roll 41, the first and second separators 31 and 32 are positioned at the center C2 of the third winding core 53. In this case, the second winding core 52 at the third position P3 maintains the loading of the finished and cut electrode assembly EA and the third winding core 53 at the first position P1 maintains the backward position of the corresponding electrode assembly EA.

Figure 7:
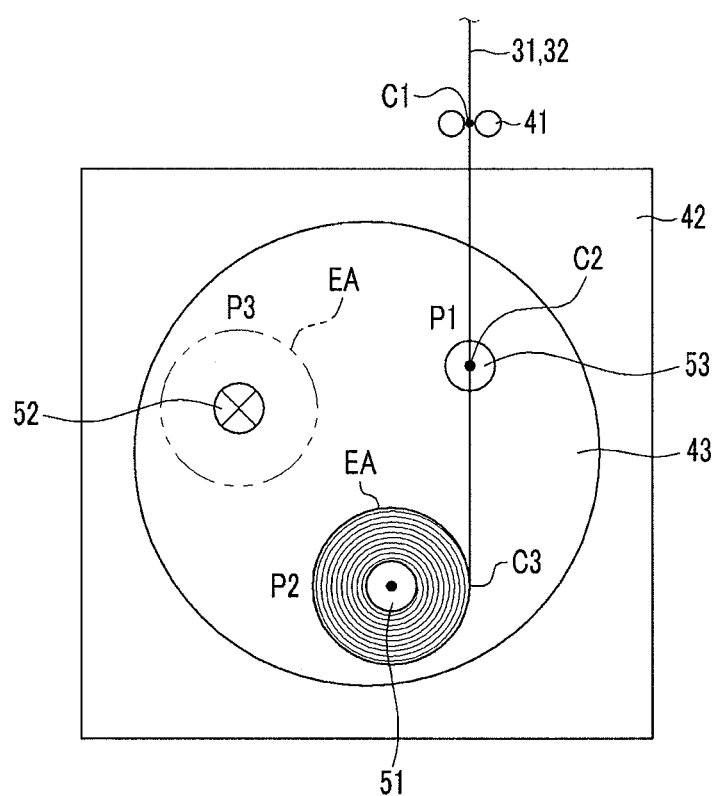
FIG. 7 is a state diagram of mounting in a third winding core, finishing/cutting in a first winding core, and removal in a second winding core following FIG. 6.

FIG. 7 is a state diagram of mounting in a third winding core, finishing/cutting in a first winding core, and removal in a second winding core following FIG. 6. Referring to FIGS. 3 and 7, the first winding core 51 will be described below. At the fourth step ST4, the electrode assembly EA wound on the moved first winding core 51 is finished and cut. In this case, the second winding core 52 at the third position P3 moves backward to be removed with the finished and cut electrode assembly EA and the third winding core 53 at the first position P1 moves forward to be mounted with the first and second separators 31 and 32. At the third step, since the first and second separators 31 and 32 are positioned at the center C2 of the third winding core 53, at the fourth step ST4, the third winding core 53 moves forward from backward to be mounted with the positive plate 10 and the negative plate 20, and the first and second separators 31 and 32 through the clamp 531.

Figure 8:
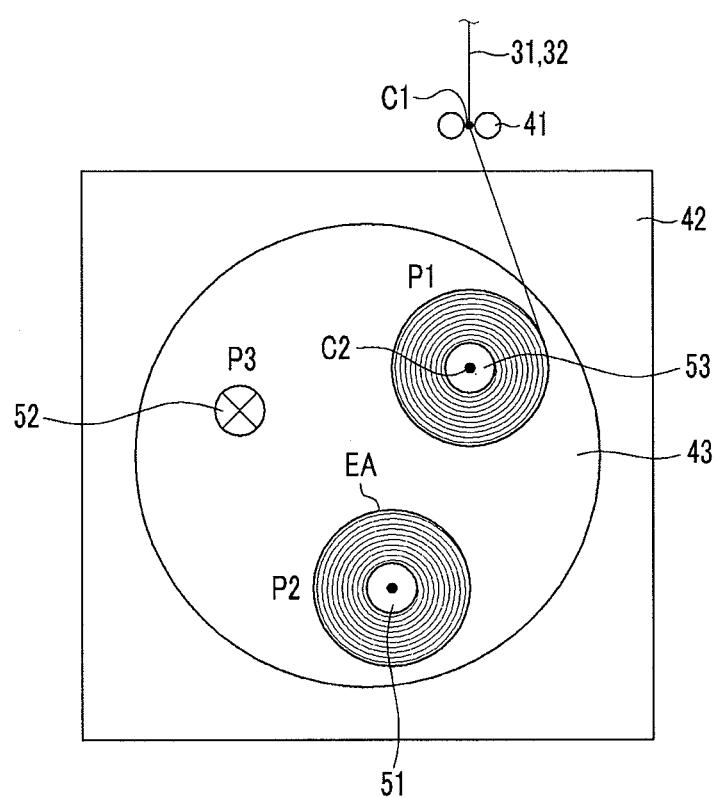
FIG. 8 is a winding operation state diagram of a third winding core following FIG. 7.

FIG. 8 is a winding operation state diagram of a third winding core following FIG. 7. Referring to FIGS. 3 and 8, the third winding core 53 will be described below. The third winding core 53 at the first position P1 winds the positive plate 10 and the negative plate 20, and the first and second separators 31 and 32 mounted on the third winding core 53 by its self rotation. In this case, the first winding core 51 at the second position P2 maintains the loading of the finished and cut electrode assembly EA and the second winding core 52 at the third position P3 maintains the backward position of the corresponding electrode assembly EA.

Figure 9:
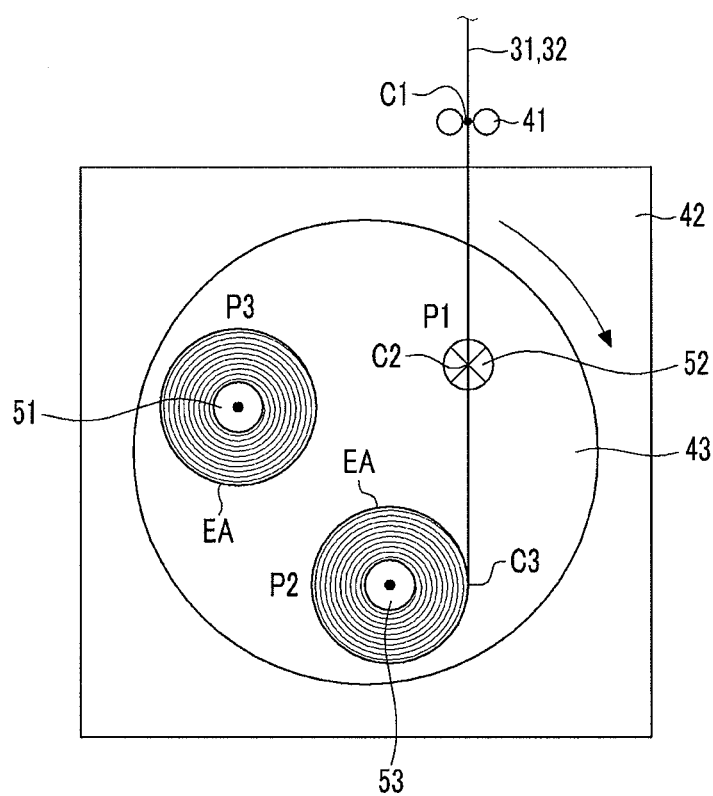
FIG. 9 is a rotating operation state diagram of a rotor after the winding-completion of a second winding core following FIG. 8.

FIG. 9 is a rotating operation state diagram of a rotor after the winding-completion of a second winding core following FIG. 8. Referring to FIGS. 3 and 9, the third winding core 53 will be described below. The third winding core 53 loading the electrode assembly EA which is winding-completed by the rotation of the rotor 43 moves from the first position P1 to the second position P2. Further, the center C1 of the nip roll 41, the center C2 of the second winding core 52 at the first position P1, and one surface C3 of the electrode assembly EA wound at the second position P2 are arranged in the substantially straight line, in more detail, the substantially vertical line. That is, since the first and second separators 31 and 32 are connected to the third winding core 53 through the nip roll 41, the first and second separators 31 and 32 are positioned at the center C2 of the second winding core 52. In this case, the first winding core 51 at the third position P3 maintains the loading of the finished and cut electrode assembly EA and the second winding core 53 at the first position P1 maintains the moving-backward of the corresponding electrode assembly EA.

Figure 10:
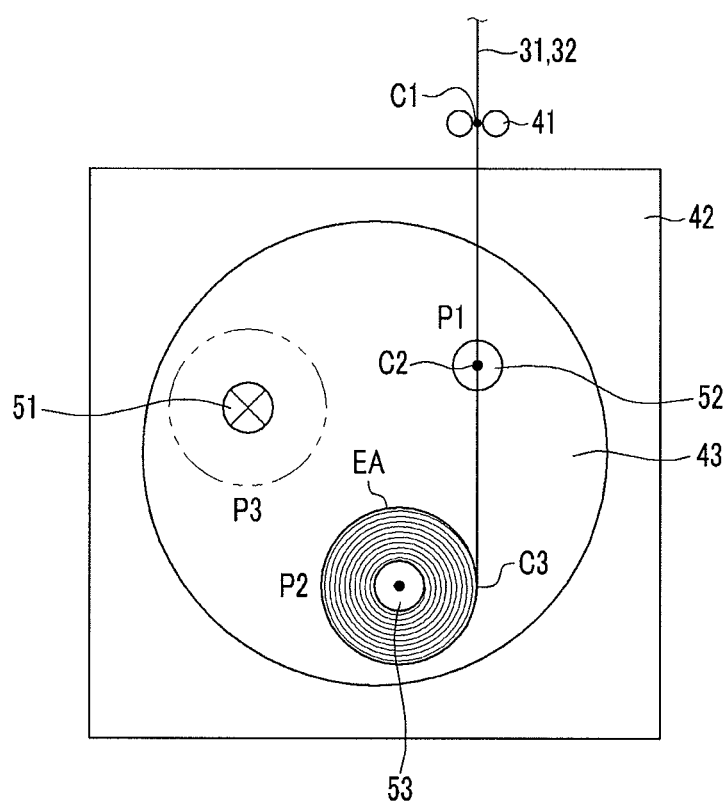
FIG. 10 is a state diagram of mounting in a second winding core, finishing/cutting in a third winding core, and removal in a first winding core following FIG. 9.

FIG. 10 is a state diagram of mounting in a second winding core, finishing/cutting in a third winding core, and removal in a first winding core following FIG. 9. Referring to FIGS. 3 and 10, the first winding core 51 will be described below. At the fifth step ST5, the electrode assembly EA of the first winding core 51 is removed by moving backward the first winding core 51 while in the third positions P3. In this case, the second winding core 52 at the first position P1 moves forward to be mounted with the first and second separators 31 and 32 and the third winding core 53 at the second position P2 finishes the wound electrode assembly EA and cuts the first and second separators 31 and 32. At the third step, since the first and second separators 31 and 32 are positioned at the center C2 of the second winding core 52, the second winding core 52 moves forward from the backward position to be mounted with the positive plate 10 and the negative plate 20, and the first and second separators 31 and 32 through the clamp 521.

Figure 11:
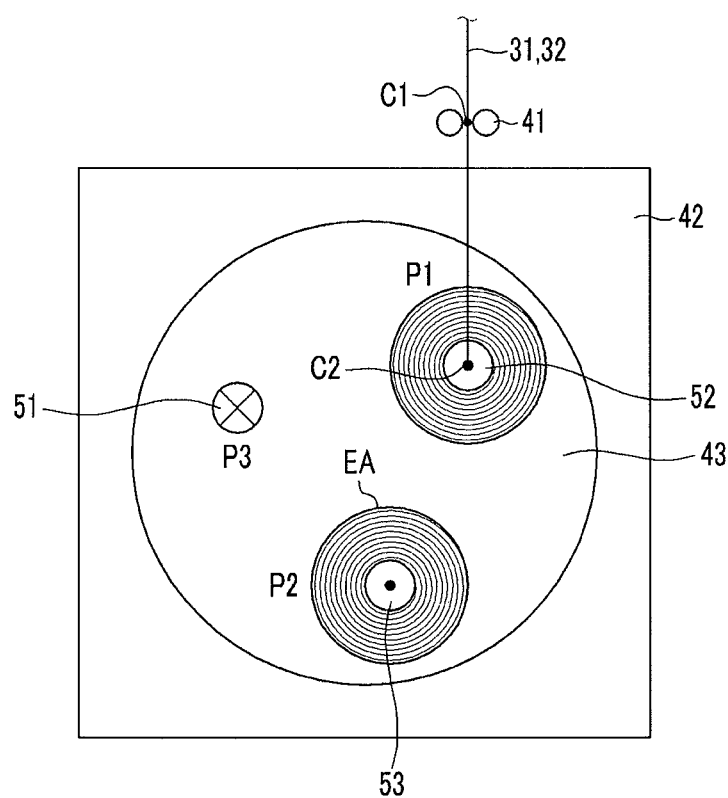
FIG. 11 is a winding operation state diagram of a second winding core following FIG. 10.

FIG. 11 is a winding operation state diagram of a second winding core following FIG. 10. Referring to FIGS. 3 and 11, the second winding core 52 will be described below. The second winding core 52 at the first position P1 winds the positive plate 10 and the negative plate 20, and the first and second separators 31 and 32 mounted on the second winding core 52 by its self rotation. In this case, the third winding core 53 at the second position P2 maintains the loading of the finished and cut electrode assembly EA and the first winding core 51 at the third position P3 maintains the backward position of the corresponding electrode assembly.

Figure 12:
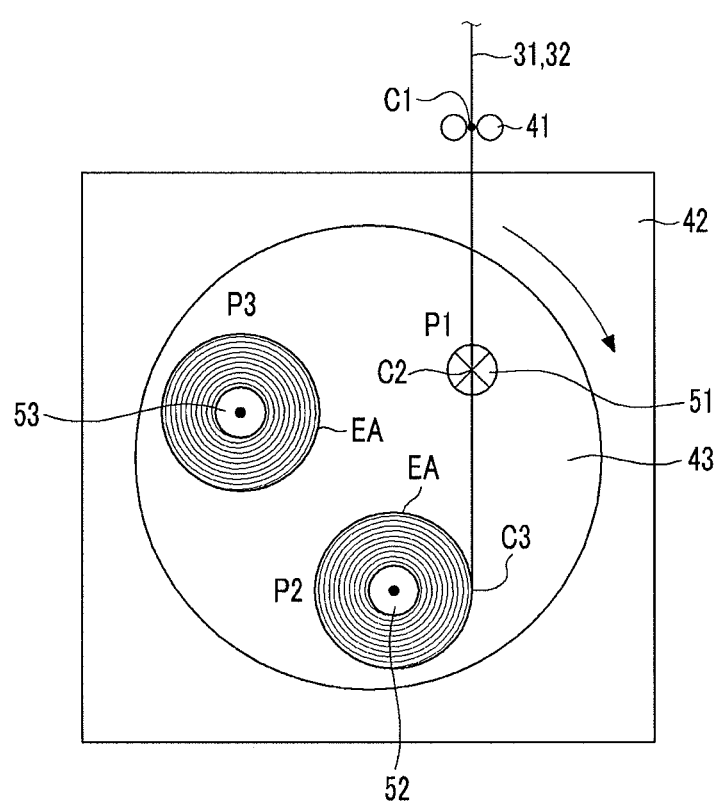
FIG. 12 is a rotating operation state diagram of a rotor after the winding-completion of a second winding core following FIG. 11.

FIG. 12 is a rotating operation state diagram of a rotor after the winding-completion of a second winding core following FIG. 11. Referring to FIGS. 3 and 12, the first winding core 51 will be described below. At the sixth step ST6, the first winding core 51 with the electrode assembly EA removed from the third position P3 to the first position P1 to prepare the new winding cycle. Further, the center C1 of the nip roll 41, the center C2 of the first winding core 51 at the first position P1, and one surface C3 of the electrode assembly EA wound at the second position P2 are arranged in the substantially straight line, in more detail, the substantially vertical line. That is, since the first and second separators 31 and 32 are connected to the second winding core 52 through the nip roll 41, the first and second separators 31 and 32 are positioned at the center C2 of the first winding core 51. In this case, the third winding core 53 at the third position P3 maintains the loading of the finished and cut electrode assembly EA and the first winding core 51 at the first position P1 maintains the backward position of the corresponding electrode assembly EA.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A winder for an electrode assembly of a rechargeable battery, comprising:
   a nip roll catching and feeding a positive plate and a negative plate, and a separator wherein the nip roll defines a center;
   a rotor disposed below the nip roll to rotate wherein the rotor defines a rotation center; and
   a plurality of winding cores each defining a center arranged in the rotor at a regular interval in a rotation direction of the rotor to rotate and move forward or backward from the rotor,
   wherein plurality of winding cores have diameters selected so that the center of the nip roll,
   the center of any one winding core among the plurality of winding cores, and
   one outer surface of an electrode assembly of another winding core which is winding-completed having a pre-selected amount of electrode assembly wound thereon form a straight line
   when the winding core interposed between the winding core that is winding completed and the nip roll is initiating winding.

2. The winder of claim 1, wherein:
   the center of the nip roll,
   the center of any one winding core among the plurality of winding cores, and
   one surface of an electrode assembly of another winding core which is winding-completed
   form a substantially vertical line.

3. The winder of claim 1, wherein:
   a link line linking the center of the nip roll, the center of the one winding core, and one surface of the electrode assembly of another winding core
   is spaced from the rotation center of the rotor by a predetermined distance.

4. The winder of claim 1, wherein:
   the plurality of winding cores,
   includes a first winding core, a second winding core, and a third winding core that are arranged at a regular interval in the rotation direction of the rotor, and
   the first winding core, the second winding core, and the third winding core
   are sequentially positioned at a first position vertically below the nip roll, and a second position and a third position that are arranged at a regular interval in the rotation direction of the rotor at the first position.

5. The winder of claim 4, wherein:
   the center of the nip roll,
   the center of any one winding core positioned at the first position among the first winding core, the second winding core, and the third winding core, and
   one surface of an electrode assembly of a winding core positioned at the second position
   form the vertical line.

6. An assembly for winding an electrode assembly of a rechargeable battery, the winding assembly comprising:
   a nip roll catching and forming a positive plate and a negative plate with a separator interposed therebetween into a continuous line of electrode assembly;
   a rotor that is positioned adjacent the nip roll that receives the continuous electrode assembly, wherein the rotor rotates to a plurality of different positions in a first rotational direction;
   a plurality of winding cores that are mounted on the rotor wherein the plurality of winding cores are movable between a forward and backward position with respect to the rotor wherein the plurality of winding cores receive the electrode assembly and have a diameter selected so that a center of the nip roll, a center of a first winding core and an outer edge of a completed electrode assembly on a second winding core having a pre-selected amount of electrode assembly wound thereon form a straight line when the first winding core interposed between the winding core that is winding completed and the nip roll is initiating winding.

7. The assembly of claim 6, wherein the rotor in a first position has a first winding core located in a rotor first position where the straight line from the nip roll extends thereto and wherein the rotor in the first position has a second winding core in a rotor second position with a completed electrode assembly wherein the edge of the completed electrode assembly is in the straight line with the center of the first winding core and the nip roll.

8. The assembly of claim 7, wherein when the rotor is in the first position, the first winding core is in the first rotor position moved into a forward position to receive the continuous electrode assembly and wherein the electrode assembly on the second winding core in the second rotor position is cut to form a completed electrode assembly.

9. The assembly of claim 8, wherein the rotor is moved from the first position to a second position wherein the first winding post is now in the second rotor position and the second winding core is in a third rotor position and wherein a third winding core, previously in a third rotor position is moved to the first rotor position and wherein the second winding core in the third rotor position is moved backward to permit removal of the completed electrode assembly.

10. The assembly of claim 9, wherein the first winding core in the second rotor position is cut to form a completed electrode assembly and wherein the third winding core now in the first winding position is moved to a forward position to receive the continuous electrode assembly.

11. The assembly of claim 6, wherein the straight line comprises a substantially vertical line.

* * * * *